I. G. OWENS.
HORSESHOE.
APPLICATION FILED APR. 27, 1909.
948,245.
Patented Feb. 1, 1910.
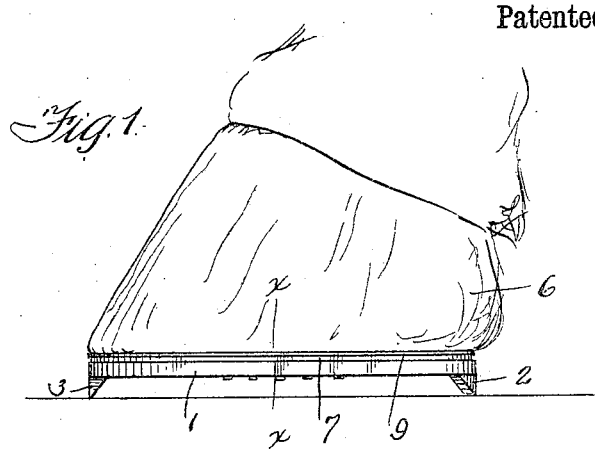
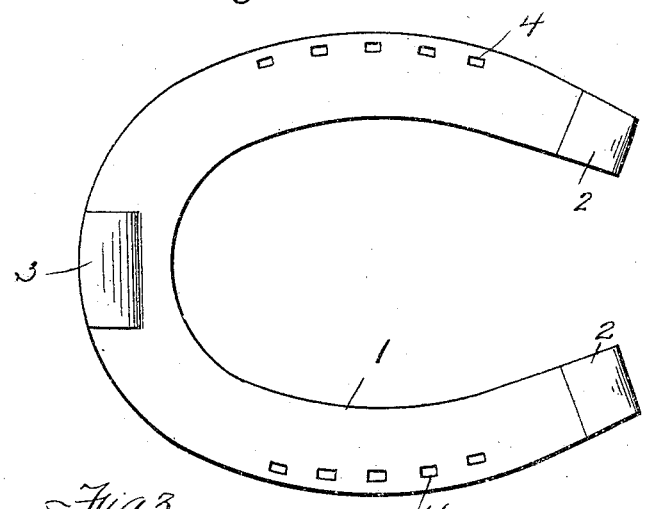
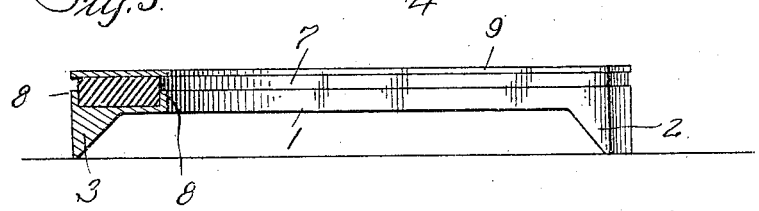
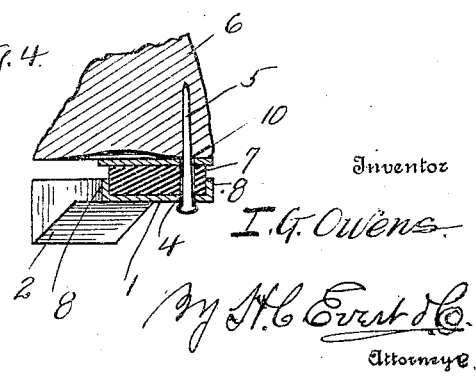
Witnesses
Samuel Payne
R. H. Butler
Inventor
I. G. Owens
By H. C. Evert & Co.
Attorneys

UNITED STATES PATENT OFFICE.

IVAN G. OWENS, OF McKEESPORT, PENNSYLVANIA.

HORSESHOE.

948,245. Specification of Letters Patent. Patented Feb. 1, 1910.

Application filed April 27, 1909. Serial No. 492,563.

*To all whom it may concern:*

Be it known that I, IVAN G. OWENS, a citizen of the United States of America, residing at McKeesport, in the county of Allegheny and State of Pennsylvania, have invented certain new and useful Improvements in Horseshoes, of which the following is a specification, reference being had therein to the accompanying drawing.

My invention relates to horseshoes, and the object of the invention is to provide a horseshoe with a cushion for protecting a horse's hoof, particularly a horse that has a tendency to " pound " his feet.

Another object of this invention is to provide a simple and durable horseshoe that will protect a horse's hoof from hard and indurate surfaces, and at the same time allow a horse to obtain a purchase or good footing particularly when climbing hills.

I attain the above objects by a horseshoe of a novel construction that will be hereinafter described in detail and then specifically claimed.

In the drawings forming a part of this specification, Figure 1 is an elevation of the horseshoe, Fig. 2 is a bottom plan of the same, Fig. 3 is a longitudinal sectional view of the shoe, and Fig. 4 is an enlarged cross sectional view taken on the line X—X of Fig. 1.

In the accompanying drawings, 1 designates a horseshoe channel-shaped in cross section, said shoe having heel calks 2, a toe calk 3, and the ordinary openings 4 for nails 5 employed for securing the shoe to a horse's hoof 6. In the channel-shaped shoe 1 is mounted a strip of resilient material 7, as rubber, this strip being rectangular in cross section and of a greater depth than the side flanges 8 of the shoe 1, whereby the strip of resilient material will project above said flanges.

A horseshoe shaped plate 9 is used in connection with the shoe 1, and this plate is provided with nail openings 10 for the nails 5.

In assembling the parts of the shoe against the hoof 6, the plate 9 is first placed upon the hoof and then the shoe 1 with the piece of resilient material mounted therein is placed against the plate 9 and the nails 5 driven into the openings 4, and through the strip of resilient material 7 and the openings 10 into the hoof 6, said nails retaining the shoe in engagement with the hoof, but allowing an expansion and contraction of the strip of resilient material while the shoe is being used.

As will be readily understood, the resilient material, under normal conditions, provides a cushion between the shoe and plate, the support afforded by the nails being sufficient to retain the parts in position. When, however, excessive draft is required, as when the load is increased or the animal is drawing a load up-hill or is attempting to " hold-back " in going down-hill, the additional pressure placed on the plate causes the latter to be forced into contact with the flanges and thereby providing practically a metallic contact between the top and bottom of the shoe, and eliminating the cushioning effect at the particular point of application of pressure, and permitting the animal to obtain a maximum action for the pressure put on the shoe, the flanges acting as a stop to limit the relative movement of plate and shoe.

While in the drawings there is illustrated a preferred embodiment of my invention, I would have it understood that the structural elements thereof can be varied or changed without departing from the spirit of the invention.

Having now described my invention what I claim as new, is:—

A horseshoe having toe and heel calks and provided at its outer and inner edges with upwardly projecting flanges, a cushion fitted between said flanges and projecting above the same, and a plate of the same contour as the shoe resting on the cushion and being of greater width than the width of said cushion, said flanges forming a stop to limit the relative movements of plate and shoe, the plate and the shoe having nail holes to receive securing nails, substantially as described.

In testimony whereof I affix my signature in the presence of two witnesses.

IVAN G. OWENS.

Witnesses:
A. H. RABSAG,
MAX H. SROLOVITZ.